United States Patent [19]

Sweeney et al.

[11] 4,126,403
[45] Nov. 21, 1978

[54] POST CONSTRUCTION
[75] Inventors: Lawrence J. Sweeney, Seneca; Glenn E. MacDonald, Franklin, both of Pa.
[73] Assignee: Franklin Steel Company, Franklin, Pa.
[21] Appl. No.: 808,794
[22] Filed: Jun. 22, 1977

Related U.S. Application Data
[63] Continuation-in-part of Ser. No. 729,403, Oct. 4, 1976, abandoned.

[51] Int. Cl.$^2$ .............................................. F16B 7/00
[52] U.S. Cl. .......................................... 403/2; 403/11; 404/10
[58] Field of Search ........................ 52/98, 99; 404/10; 403/2, 11, 293, 312; 40/125 N, 125 H

[56] References Cited
U.S. PATENT DOCUMENTS
3,912,404  10/1975  Katt .......................................... 403/2

Primary Examiner—John E. Murtagh
Attorney, Agent, or Firm—Fitch, Even, Tabin & Luedeka

[57] ABSTRACT

A post construction is disclosed wherein an upper post section has its lower portion disposed in overlapped relation with the upper end portion of a lower post section and is connected thereto through a pair of breakaway elements which facilitate breakaway movement of the upper post section relative to the lower post section when the upper section is subjected to a predetermined impact force such as from a motor vehicle. A retainer bar is connected to the upper and lower post sections in a manner to prevent complete release of the post sections from each other upon impact, the retainer bar having lost motion connection with at least one of the post sections in a manner to substantially dissipate the impact force. In a preferred embodiment, the retainer bar is formed with offset web contact portions adapted to engage the opposed webs of the superimposed post sections and establish solid interconnection therebetween.

16 Claims, 8 Drawing Figures

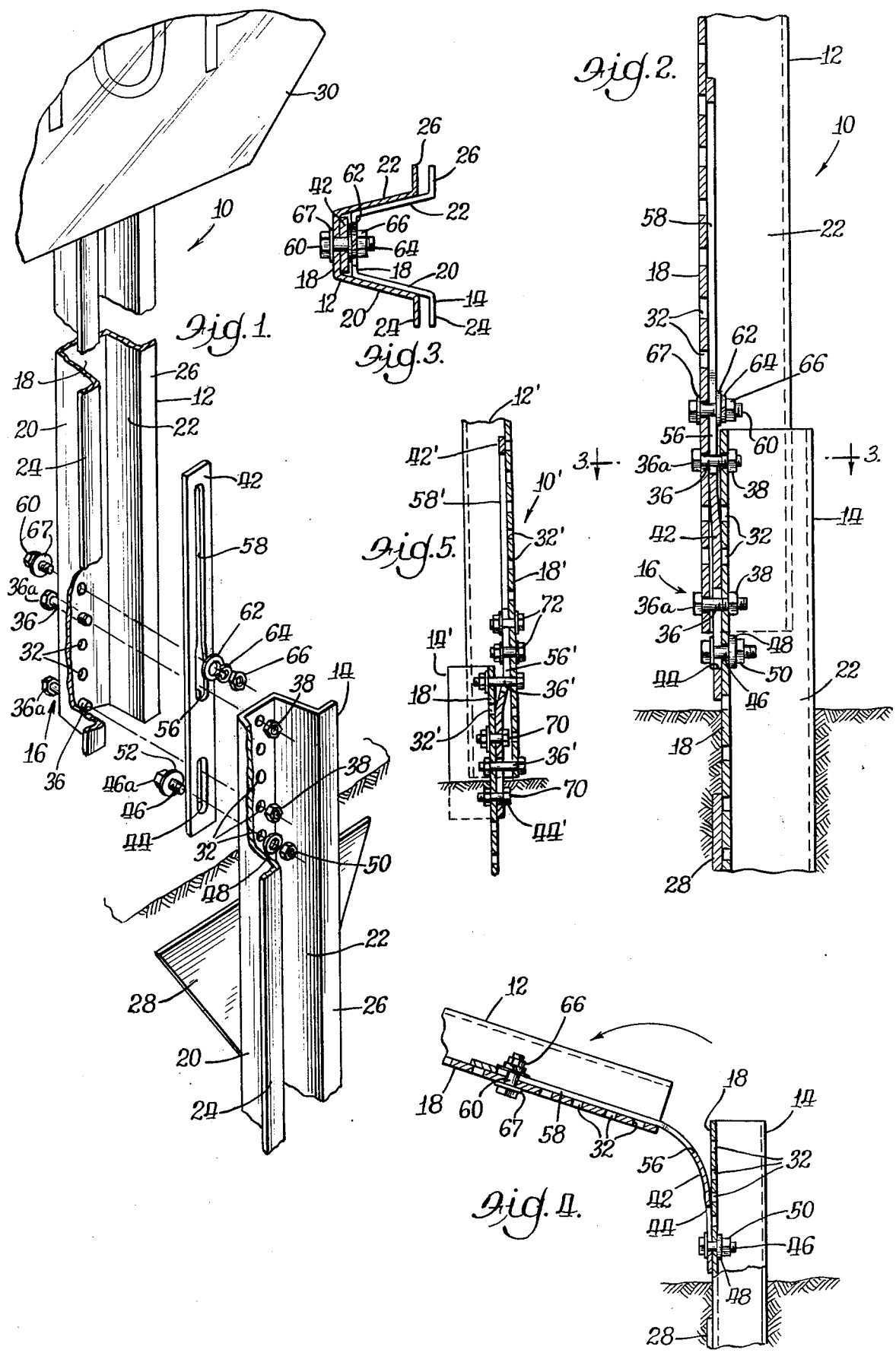

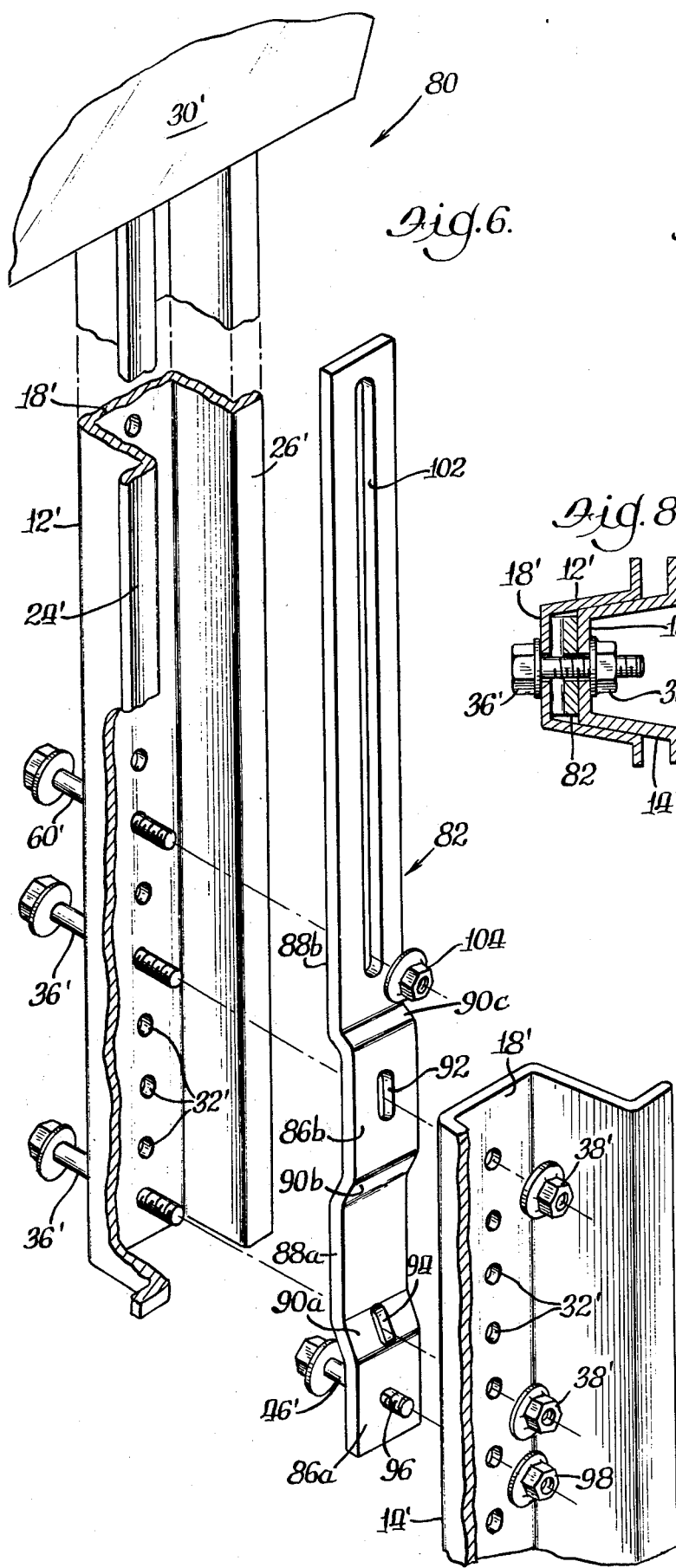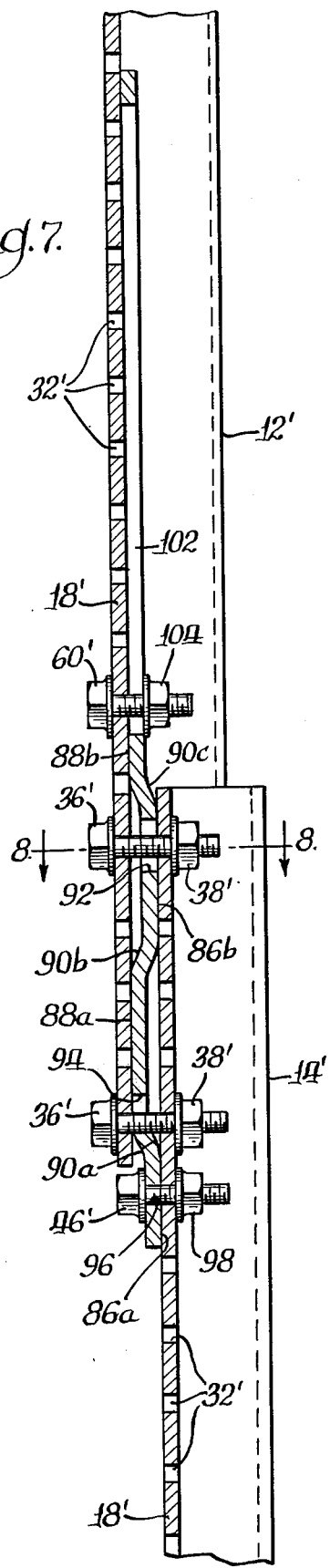

POST CONSTRUCTION

This is a continuation-in-part of copending application Ser. No. 729,403, filed Oct. 4, 1976 and now abandoned.

The present invention relates generally to posts, such as might be used in street and highway sign constructions, and more particularly to a post construction having upper and lower post sections which are connected in a novel manner to facilitate release of the upper post section from the lower post section when it is subjected to a predetermined impact force such as from a motor vehicle, the post including means to prevent complete release of the upper post section so as to prevent damage to nearby persons and property by the released upper post section.

One problem inherent in posts of the type as generally used for street and highway sign support posts is their susceptibility to being impacted by a high speed vehicle in a manner to damage or completely destroy the sign posts. To overcome the obvious safety hazard of totally nonbreakable sign posts, wooden posts have been employed which, when impacted by a vehicle, are generally broken and damaged beyond repair. The time and costs of repair and replacement are substantial.

In an attempt to overcome the problems presented by the use of wooden sign posts, it has become a practice to employ posts made of metallic channel members. In those areas where the probability of impact by a vehicle is relatively high, a further practice has been to make such metallic posts of a base or lower post section, which is generally driven into the ground or affixed in a concrete footing, and to affix to the lower post section an upper post section through a breakaway connection so that upon impact the upper section is released from the lower section. When the upper post section is released from its associated lower post section and is damaged on impact by a motor vehicle or the like, either another upper post section is reconnected to the lower post section or the damaged post section is repaired and then reconnected by replacing the breakaway connection or coupling elements.

It is also a known practice in such post constructions to provide means to prevent complete release of the upper post section from the lower post section so as to prevent the upper post section from acting as a flying missile and injuring or damaging surrounding property and personnel, as well as the occupants of the vehicle which impacted the sign post.

A general object of the present invention is to provide a novel post construction which employs a highly efficient and economical breakaway connection between a lower post section and an upper post section to facilitate release of the upper post section when subjected to a predetermined impact force such as from a motor vehicle.

A more particular object of the present invention is to provide a novel post construction wherein an upper post section is secured to a lower post section through one or more breakaway elements which are received through and interconnect overlapped portions of the post sections, and wherein a retainer bar is connected to the upper and lower post sections in a manner to facilitate release of the upper post section when subjected to a predetermined impact force but maintain interconnection between the post sections so as to prevent the upper post section from acting as a dangerous projectile.

A feature of the present invention lies in the provision of a retainer bar having lost motion connection to at least one of the upper and lower post sections in a manner to dissipate the impact force tending to completely separate the post sections.

Another feature of the invention lies in the provision of a retainer bar for interconnecting the upper and lower post sections together to prevent complete release therebetween, wherein the retainer bar has web engaging portions offset from the axis of the bar so as to engage the opposed webs of the nested post sections and establish solid interconnection therebetween.

Further objects and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 1 is a foreshortened exploded perspective view of a post construction in accordance with the present invention, portions being broken away for clarity;

FIG. 2 is a partial longitudinal sectional view showing the post sections of FIG. 1 in connected relation;

FIG. 3 is a transverse sectional view taken substantially along line 3—3 of FIG. 2;

FIG. 4 is a view similar to FIG. 2 but reduced in scale and showing the upper post section shown after impact;

FIG. 5 is a partial longitudinal sectional view showing an alternative manner of connecting the upper and lower post sections;

FIG. 6 is a fragmentary exploded perspective view of a post construction in accordance with another embodiment of the present invention which employs a preferred form of retainer bar;

FIG. 7 is a fragmentary longitudinal sectional view of the post construction of FIG. 6 but with the various components in assembled relation; and FIG. 8 is a transverse sectional view taken substantially along the line 8—8 of FIG. 7.

Referring now to the drawings, and in particular to FIGS. 1–4, a post construction in accordance with one embodiment of the present invention is indicated generally at 10. In the illustrated embodiment, the post 10 is of an open flanged channel construction similar to that frequently employed in street and highway sign support posts. The post 10 includes an upper post section 12 and a lower post section 14 which are normally connected by connecting means, indicated generally at 16.

The channels comprising the upper and lower post sections 12 and 14 are of substantially identical configuration and each includes a web portion 18 terminating at its lateral edges in angularly outwardly directed side walls 20 and 22 the outer edges of which terminate in laterally outwardly directed coplanar flanges 24 and 26. The illustrated upper and lower post sections 12 and 14 are generally termed channel U posts. The lower post section 14 is adapted to be driven into the ground or otherwise secured in upstanding relation to a footing such that approximately the top four inches of the lower post section are above grade level. If driven into the ground, a plate 28 may be secured to the lower post 14 to stabilize and prevent rotation of the lower post. When secured to the lower post section 14 in assembled relation therewith, the upper post section 12 is disposed in upstanding relation and may support a sign, such as partially shown at 30, adjacent its upper end. The channel U post sections 12 and 14 conventionally have equidistantly spaced openings 32 formed on one or two inch centers longitudinally along the webs 18 to facilitate connection of signs and the like to the posts, or connection of multiple lengths of channel to each other.

In accordance with the post construction 10 of the present invention, the lower end portion of the upper post section 12 and the upper end portion of the lower post section 14 and disposed in juxtaposed or side-by-side overlapping relation. As best seen in FIG. 3, the post sections 12 and 14 are adapted to nest when placed in such juxtaposed or side-by-side overlapping positions. When in nested relation, the opposing web portions 18 may be slightly separated or spaced as shown, the extent of such spacing being dependent upon the weight and cross sectional configurations of the channels used. By "weight" is meant the weight, e.g. pounds, per unit length of the channels. In the embodiment illustrated in FIGS. 1-4, the upper and lower post sections 12 and 14 are positioned such that the lower four holes 32 on the upper post and the upper four holes 32 on the lower post section are axially aligned.

The overlapping or juxtaposed portions of the upper and lower post sections 12 and 14 are secured together by the connecting means 16 in a manner to facilitate breakage of the connection when the upper post section is subjected to a predetermined impact force, such as by a motor vehicle or the like, so that the upper post section will release from the lower post section. To this end, the connection means 16 includes breakaway elements in the form of a pair of breakaway or frangible connector bolts 36 which are inserted through the upper and lower aligned holes 32 of the four sets of aligned holes in the juxtaposed portions of the upper and lower post sections in normal relation to the longitudinal axes of the posts. The head portions 36a of the breakaway bolts 36 are disposed against the outer surface of the web 18 of the upper post section, and nuts 38 are threadedly secured to the bolt shanks and snugged against the inner surface of the web 18 of the lower post section, although the bolts may be reversed in direction. The breakaway bolts 36 may comprise conventional commercially available standard strength bolts which are installed in a manner to maintain the upper and lower post sections in connected relation when the upper post section is subjected to a relatively low impact force such as by children climbing on the post, but which will break or fracture when the upper post section is subjected to a predetermined relatively high impact force such as when hit by a motor vehicle or other means imparting a relatively high impact force. In some applications, it may be desirable to employ high strength bolts, such as Grade 8, for the breakaway bolts 36.

While the embodiment of FIGS. 1-4 employs breakaway elements in the form of breakaway bolts 36, it will be understood that other types of breakaway elements may be employed such as rivets or suitable connecting pins installed in a manner to secure the juxtaposed portions of the post section in connected relation but which are capable of breaking or fracture when the upper post section is subject to a predetermined impact force. The breakaway bolts, however, provide a highly efficient and economical form of breakaway element.

An important feature of the present invention lies in the provision of retainer means in the form of a metallic retainer or tie bar 42 which extends longitudinally of the posts 12 and 14 and is connected thereto independently of the breakaway bolts 36 so as to prevent complete release of the post sections upon fracture of the breakaway bolts. In the embodiment of FIGS. 1-4, the retainer bar 42 is interposed between the webs 18 of the upper and lower post sections 12 and 14 and has separate connection to the upper and lower post sections by means of identical upper and lower retainer elements in the form of retainer bolts 46 and 60, respectively, so as to prevent complete release of the upper post section from the lower post section after the upper post is subjected to an impact force sufficient to break the breakaway bolts 36. The provision of the retainer bar 42 and its connection to the upper and lower post sections is of importance in increasing the safety of the post construction 10 by preventing complete release of the upper post section from the lower post section upon impact whereupon the upper post section could become a flying missile endangering persons or property in proximity to the post 10.

The retainer bar 42 has an elongated slot 44 adjacent its lower end which receives the lower breakaway bolt 36 therethrough. The lower retainer bolt 46 is also inserted through the elongated slot 44 and through an aligned opening 32 in the flange 18 of the lower post section 14. A plain washer 48 is received over the threaded end of the bolt 46 and a nut 50 is threadedly secured on the bolt and snugged against the washer 48 to fixedly secure the lower end of the retainer bar 42 to the lower post section 14. A lock washer may be disposed between the washer 48 and nut 50 if desired. A plain washer 52 is disposed between the head 46a of the lower retainer bolt 46 and the retainer bar 42 as shown.

The retainer bar 42 has a second elongated slot 56 formed therethrough which is spaced longitudinally upwardly from the slot 44. The upper end of the elongated slot 56 is shown as intersecting a longitudinal extending slot 58 which has narrower transverse width than the slot 56. The elongated slot 58 provides a lost motion connection between the retainer bar 42 and the upper post section 12 and serves to at least partially dissipate any impact force imparted to the upper post section which is of sufficient magnitude to fracture the breakaway bolts 36, as will become more apparent hereinbelow. Alternatively, the slot portion 58 may be of equal uniform transverse width with the slot 56 in which case the retainer bolt 60 and associated nut 66, to be described more fully below, are tightened to provide selective sliding relation between the upper post 12 and the retainer bar 42.

The elongated slot 56 is adapted to receive the upper breakaway bolt 36 therethrough and also receives the shank of the upper retainer bolt 60 therethrough after it is inserted through an opening 32 in the flange 18 of the upper post section, such as the opening 32 next above the upper breakaway bolt 36. A flat washer 62, a lock washer 64 and a nut 66 are mounted on the threaded end of retainer bolt 60 to secure the tie bar 42 to the upper post section 12. A plain washer 67 is disposed between the head of bolt 60 and the web of post 12. The nut 66 is snugged against the lock washer 64 sufficiently to retain the retainer bar 42 against the web 18 of the upper post section 12 but permits relative sliding between the upper post section and the retainer bar as will be described. The retainer bolts 46 and 60 are identical to each other and preferably comprise commercially available high strength bolts. It will be seen that the retainer bolts 46 and 60 are not subjected to axial tensile force components of the same magnitude as the breakaway bolts 36 when the upper post section 12 is subjected to impact forces.

With the upper and lower post sections 12 and 14, respectively, being secured together to form the post 10 as thus described, operation of the post when the upper post section is subjected to a predetermined impact force, such as when impacted by a motor vehicle or the like, is briefly as follows. When the upper post section is impacted by a vehicle, assuming the direction of the impact force to be generally "head-on" or substantially normal to the planes of the webs 18, the breakaway bolts 36 will fracture releasing the upper post section from direct connection to the lower post section 14. With particular reference to FIG. 4, fracture of the breakaway bolts 36 to release the upper post section from the lower post section allows the retainer bar 42 to bend about a bend axis transverse to its longitudinal axis. Depending upon the impact force imparted to the upper post section, the retainer bar 42 will generally bend uniformly in the area of the slots 44 and 46, with the upper post section assuming an angularly inclined position relative to the lower post section as indicated by the arrow in FIG. 4.

As the impact force of the upper post section separates the upper and lower post sections, the retainer bar 42 remains attached to the lower post section through the lower retainer bolt 46. The upper post section and associated retainer bolt 60 begin to slide along the length of the retainer bar simultaneously with bending of the retainer bar. When the slot 58 is made of equal width to slot 56, the sliding relation of the upper post 12 on the retainer bar is controlled by selective pretightening of nut 66 against the washer 62 to obtain a desired frictional resistance to free sliding of the upper post section along the retainer bar. When slot 58 is made of a width slightly less than the diameter of the shank of bolt 60, the shank of the upper retainer bolt 60 is caused to enter the narrowed elongated slot 58 when the upper post 12 is impacted, so that free movement of the bolt 60 toward the upper end of the elongated slot 58 is retained by the frictional interference between the slot 58 and bolt 60. In either case, the frictional resistance to free sliding movement of the upper post serves to dissipate a substantial portion of the impact energy which has been imparted to the upper post section. The retainer bar 42 thus serves to cooperate with the upper post 12 through the retainer bolt 60 to dissipate a substantial portion of the impact force imparted to the upper post section 12 while also providing a lost motion connection between the retainer bar and the upper post section.

It can thus be seen that the retainer bar 42 prevents complete release of the upper post section 12 from the lower post section 14 with the result that the upper post section cannot undergo free flight after impact and become a dangerous flying missile.

While FIGS. 1–4 illustrate one arrangement for securing the upper post section 12 to the lower post section 14, it will be understood that other arrangements may be employed without departing from the present invention. For example, FIG. 5 partially illustrates an alternative embodiment of a post construction, indicated generally at 10', in accordance with the present invention wherein an upper post section, indicated at 12' is secured to and supported by a lower post section indicated at 14'. The lower post section 14' is driven into the ground in similar fashion to the above described lower post section 14, with the upper post portion 12' being secured to and supported by the lower post section in upstanding relation.

In the embodiment of FIG. 5, the lower portion of the upper post section 12' is disclosed in juxtaposed or side-by-side overlapping relation to the upper portion of the lower post section 14' and is secured thereto by connecting means comprising breakaway elements in the form of a pair of breakaway bolts 36' received through axially aligned openings 32' in the juxtaposed portions of the upper and lower post sections and through elongate slots 44' and 56' in a retainer bar 42'. It will be noted that a spacing exists between the opposed webs 18' of the upper and lower post sections 12' and 14', respectively, due to engagement of the angularly inclined side walls of the post channels as was noted above in respect to the upper and lower post channels of the support post 10.

The retainer bar 42' is interposed between the webs 18' of the upper and lower post sections 12' and 14'. The retainer bar 42' differs from the above described retainer bar 42 in that it is secured to the lower post section 14' through a pair of retaining bolts 70 which are identical to the above described retaining bolts 46 and 60. The lower retaining bolt 70 is received through the elongated slot 44' while the upper retaining bolt 70 is received through a suitable opening in the retainer bar 42' axially aligned with an opening 32' in the lower post section 14'.

The retainer bar 42' is secured to the upper post section 12' through a pair of retaining bolts 72 which are identical to the retaining bolts 70 and are received through openings 32' in the upper post section and through the elongated slot 56' in the retainer bar 42'. The breakaway bolts 36' directly connect the overlapping portions of the upper and lower post sections together in similar fashion to the embodiment of FIG. 2 except that one retainer bolt 70 is disposed between the breakaway bolts 36'. The elongated slot 56' terminates at its upper end in a reduced width slot 58' which serves to frictionally engage the retaining bolts 72 and substantially dissipate any impact force imparted to the upper post section which is sufficient to break the breakaway bolts 36' and effect release of the upper post section from the lower post section. The manner in which the upper post section 12' is released from connection to the lower post section 14' but is retained or prevented from complete disconnection therefrom by means of the retainer bar 42' is substantially identical to the above described post construction 10.

It will be understood that a separate length of channel similar to the post sections 12 and 14 but shorter in length could be secured to the upper post section 12 in nested relation therewith and may receive a portion of the retainer bar 42 between their opposed web portions. Such separate length of channel would reinforce the upper post section in the area of normal impact to minimize bending of the lower end of the upper post section and thereby facilitate reuse and reassembly of the upper post section onto the lower post section.

FIGS. 6–8 illustrate another and preferred embodiment of a post construction, indicated generally at 80, in accordance with the present invention. The post construction 80 is generally similar to the aforedescribed post construction 10 and elements having similar configuration to the elements of the post construction 10 are indicated with the same but primed reference numerals. The post construction 80 differs from the aforedescribed post construction 10 primarily in its employment of a corrugated retainer bar, indicated generally at 82, which provides positive engagement with and thereby solid interconnection between the opposed substantially parallel web portions of the nested portions of the upper and lower post sections 12' and 14' so as to prevent relative wobble between the connected post sections.

The juxtaposed nested portions of the upper post section 12' and lower post section 14' are connected by connecting means comprising a pair of elongate breakaway elements in the form of frangible breakaway connector bolts 36' which are inserted through aligned holes 32' in the juxtaposed portions of the upper and lower post sections in similar fashion to the above described post construction 10. The head portions and integral washers of the connector bolts 36' are disposed against the outer surface of the web 18' of the upper post section, and integral nut-washers 38' are threadedly secured on the bolt shanks and snugged against the inner surface of the web 18' of the lower post section, although the bolts may be reversed in direction as desired.

In connecting the lower end portion of the upper post section 12' to the upper end portion of the lower post section 14' in nested juxtaposed relation, a space is normally created between the opposed web portions 18' of the respective post sections due to the fact that the post sections are of substantially identical transverse configuration and the angularly outwardly directed side walls 20' of the nested post sections engage each other and establish a space between the parallel webs 18', as best seen in FIG. 8.

The spacing normally established between the opposed web portions 18' is greater than the thickness required for a retainer bar having sufficient strength to retain the upper post section to the lower post section when the upper post section is subjected to an impact force sufficient to break or fracture the connector bolts 36'. As a result, it is desirable that a retainer bar be provided which provides positive engagement with and substantially solid interconnection between the opposed web portions of the juxtaposed post sections. To this end, the retainer bar 82 is corrugated in side profile to define contact areas 86a and 86b which positively engage the flange 18' of the lower post section 14', and define contact areas 88a and 88b which engage the opposed web 18' of the upper post section 12'. It is seen that the contact areas 86a, b and 88a, b alternate along the length of the retainer bar and are offset, respectively, from a medium plane defined at the midpoint between and parallel to the surfaces 86a, b and 88a, b. In this manner, alternate contact areas of the retainer bar contact one of the post section webs, while the intermediate contact areas 88a, b contact the web of the other post section.

The contact areas 86a, b and 88a, b are formed by offset bends in the retainer bar as indicated at 90a, 90b and 90c. The contact areas 86a, b and 88a, b are spaced a sufficient distance so as to positively engage the opposed web surfaces and provide a solid interconnection between the opposed webs 18' through the retainer bar. In this manner, any wobble of the retainer bar is eliminated.

The retainer bar 82 has elongated openings 92 and 94 which receive the breakaway bolts 36' therethrough. A lower retainer bolt 46' is inserted through an opening 96 in the retainer bar 82 and through an aligned opening 32' in the lower post section for receiving an integral nut-washer 98 thereon to secure the retainer bar to the lower post section.

An upper retainer bolt 60' is inserted through an opening 32' in the upper post section and through an elongated slot 102 in the retainer bar 82 to receive an integral nut-washer 104. The retainer bolt 60' forms a lost motion connection between the retainer bar 82 and the upper post section 12' in similar fashion to the lost motion connection of the aforedescribed retainer bar 42 to the upper post section 12.

In assembled relation, the juxtaposed portions of the upper and lower post sections 12' and 14' are secured together by the breakaway bolts 36' with the contact areas 86a, b and 88a, b of the retainer bar 82 engaging the opposed web portions 18'. The retainer bolts 46' and 60' affix the retainer bar to the post sections 14' and 12', respectively.

In operation, when the upper post section 12' is subjected to a predetermined impact force, such as being impacted by an automobile, such impact force will fracture the breakaway connector bolts 36' to disengage the upper post section from the lower post section. Thereafter, the upper post section will move along the length of the retainer bar 82 simultaneously with bending of the retainer bar in the direction of the applied impact force so as to prevent complete release of the upper post section from the lower post section with its attendant danger as a flying missile.

The breakaway bolts 36' may generally comprise 5/16 - 18 grade 5 bolts. In some applications, however, such as in areas where high winds occur, it may be desirable to select breakaway bolts of grade 8. It may also be desirable to provide frictional engagement between the shank of the upper retainer bolt 100 and the slot 102 so as to dissipate some of the impact energy during movement of the upper post section along the length of the retainer bar upon impact, as was described above in respect to the restrictive slot 58 in retainer bar 42.

Thus, in accordance with the present invention, a post construction is provided wherein an upper post section is secured to a lower post section in a manner to facilitate breakaway of the upper post section from the lower post section when subjected to a predetermined impact force, yet which prevents complete release of the upper post section in a manner as would allow the upper post section to act as a projectile. The means for connecting the juxtaposed portions of the upper and lower post sections, namely, breakaway elements in the form of bolt means 36 and 36' disposed substantially normal to the longitudinal axes of the post sections, provides a highly economical and easily replaceable safety means for connecting an upper post section to the ground supported lower post section.

While preferred embodiments of the present invention have been illustrated and described, it will be obvious to those skilled in the art that changes and modifications may be made therein without departing from the invention in its broader aspects. Various features of the invention are defined in the following claims.

What is claimed is:

1. A post construction adapted to be disposed in generally upstanding relation, said post comprising upper and lower post sections, the lower end portion of said upper post section being in overlapped relation with the upper end portion of said lower post section, means connecting said post sections in said overlapped relation, said connecting means including at least one breakaway element comprising an elongate connecting element extending through each of said post sections in the overlapped zone and disposed substantially normal to the longitudinal axes of said post sections so as to retain said overlapped portions in connected relation, said breakaway element being adapted to be broken to release said overlapped post portions when said upper post section is subjected to a predetermined impact force, and a longitudinally extending retainer bar connected to said upper and lower post sections independently of said breakaway element in a manner to prevent complete release of said post sections from each other when said upper post section is subjected to said predetermined impact force.

2. A post construction as defined in claim 1 wherein said upper and lower post sections comprise elongate channel members, and wherein said overlapped portions of said post sections are disposed in substantially nested relation.

3. A post construction as defined in claim 1 wherein said connecting means includes a pair of elongate connecting elements each of which comprises a frangible bolt, said bolts extending through said overlapped portions of said upper and lower post sections and affixing said juxtaposed portions to each other until broken when said upper post section is subjected to said predetermined impact force.

4. A post construction as defined in claim 1 including at least two retaining elements each of which connects a different one of said upper and lower post sections to said retainer bar, said retaining elements cooperating with said tie bar and said post sections to prevent complete separation of said upper and lower post sections when said upper post section is subjected to said predetermined impact force.

5. A post construction as defined in claim 1 wherein said retainer bar comprises a generally flat bar defining a bend axis about which said upper post section is bendable relative to said lower post section when said upper post section is subjected to said predetermined impact force.

6. A post construction as defined in claim 5 including at least two retaining elements each of which connects a different one of said upper and lower post sections to said retainer bar, at least one of said upper and lower post sections having lost motion connection to said retainer bar.

7. A post construction as defined in claim 1 wherein said retainer bar has an elongated slot therethrough through which a retainer element is disposed to establish a lost motion connection between said retainer bar and an associated one of said post sections.

8. A post construction as defined in claim 1 wherein said upper and lower post sections comprise elongate generally U-shaped channels having their said overlapped portions in nested relation with their webs lying in substantially parallel planes, said retainer bar is disposed between said webs, said breakaway element comprises an elongate connecting element extending through the webs of said overlapped channel portions and through said retainer bar so as to retain said overlapped channel portions in connected relation, and including at least two retaining elements each of which connects a different one of said upper and lower channel sections to said retainer bar, said breakaway element being adapted to break when said upper channel section is subjected to said predetermined impact load so as to release said connection of said overlapped channel portions, and said retainer elements being adapted to maintain connection of said upper and lower channel sections to said retainer bar to prevent complete release of said upper channel section from said lower channel section.

9. A post construction as defined in claim 8 wherein one of said channel sections is connected to said retainer bar through a lost motion connection therewith.

10. A post construction as defined in claim 8 including two retaining elements connecting each of said channel sections to said retainer bar.

11. A post construction as defined in claim 7 wherein said elongated slot has a restricted portion cooperable with said retainer element to effect frictional sliding engagement therewith when said upper post section is subjected to said predetermined impact force, said frictional sliding serving to dissipate the impact force imparted to said upper post section.

12. A kit for connecting an upper post section to a lower post section in a manner to provide a post construction wherein the upper post section is adapted to breakaway from said lower post section when subjected to a predetermined impact force, said upper and lower post sections having portions adapted for overlapping relation relative to each other and each having a plurality of openings therethrough which are adapted for axial alignment with holes in the other post section, said kit comprising at least one pair of retainer elements, at least one breakaway element, and an elongated retainer bar, said retainer bar being adapted to have said retainer elements connected thereto, said retainer elements each being adapted to be received through a hole in a selected one of said post sections for connecting said selected post section to said retainer bar so that each of said post sections is separately connected to said retainer bar, and said breakaway element being adapted to be received through a pair of said aligned openings in said post sections so as to connect said post sections together independently of said connection of said post sections to said retainer bar, said breakaway element being adapted to break and release said post sections when said upper post section is subjected to said impact force, said retainer bar and retainer elements preventing complete release of said post sections.

13. A kit as defined in claim 12 wherein said retainer element comprise retainer bolts, and wherein said retainer bar includes at least one elongated slot therethrough adapted to receive one of said retainer bolts therethrough so as to provide a lost motion connection between said retainer bar and the associated one of said post sections.

14. A post construction adapted to be mounted in generally upstanding relation, said post including upper and lower post sections comprising generally U-shaped channels having web portions, the lower end portion of said upper post section being in overlapped relation with the upper end portion of said lower post section and with said web portions lying in substantially parallel planes, means connecting said post sections in said overlapped zone and adapted to be broken to release said post sections when said upper post section is subjected to a predetermined impact force, and a retainer bar connected to said upper and lower post sections independently of said connecting means in a manner to prevent complete release of said post sections from each other when said upper post section is subjected to said predetermined impact force, said retainer bar being disposed between said overlapped web portions and having a configuration defining at least two distinct web contact surfaces adapted to engage each of the opposed web portions so as to prevent wobble between said connected post sections.

15. A post construction as defined in claim 14 wherein said retainer bar is corrugated in profile configuration so as to define longitudinally spaced web contact surfaces facing oppositely outwardly from the longitudinal axis of the retainer bar, said contact surfaces positively engaging the opposed web portions when said upper and lower post sections are connected in said overlapped zone so as to establish a solid interconnection between said post sections.

16. A post construction as defined in claim 15 wherein said web contact areas are offset from the longitudinal axis of said retainer bar in alternating relation so that alternate contact surfaces engage the web of one of said post sections and the intermediate contact surfaces engage the web of the other of said post sections.

* * * * *

UNITED STATES PATENT AND TRADEMARK OFFICE
CERTIFICATE OF CORRECTION

PATENT NO. : 4,126,403
DATED : November 21, 1978
INVENTOR(S) : Lawrence J. Sweeney and Glenn E. MacDonald It is certified that error appears in the above-identified patent and that said Letters Patent are hereby corrected as shown below:

Column 5, line 41, "retained" should be --resisted--

Column 7, line 50, "medium" should be --median--

Signed and Sealed this

Fifth Day of June 1979

[SEAL]

Attest:

RUTH C. MASON
Attesting Officer

DONALD W. BANNER
Commissioner of Patents and Trademarks